(12) United States Patent
Matsui (10) Patent No.: US 9,930,199 B1
(45) Date of Patent: Mar. 27, 2018

(54) IMAGE READING DEVICE AND IMAGE FORMING APPARATUS

(71) Applicant: KYOCERA Document Solutions Inc., Osaka (JP)

(72) Inventor: Shinya Matsui, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/715,501

(22) Filed: Sep. 26, 2017

(30) Foreign Application Priority Data

Sep. 28, 2016 (JP) ................................. 2016-190390

(51) Int. Cl.
| | | |
|---|---|---|
| *H04N 1/00* | (2006.01) | |
| *H04N 1/401* | (2006.01) | |
| *G06K 7/14* | (2006.01) | |
| *G06K 9/20* | (2006.01) | |

(52) U.S. Cl.
CPC ..... *H04N 1/00827* (2013.01); *H04N 1/00806* (2013.01); *H04N 1/00809* (2013.01); *H04N 1/401* (2013.01); *G06K 7/1417* (2013.01); *G06K 9/2063* (2013.01); *G06K 2209/03* (2013.01); *H04N 2201/0094* (2013.01)

(58) Field of Classification Search
CPC ............... H04N 1/00827; H04N 1/401; H04N 1/00809; H04N 1/00806; H04N 2201/0094; G06K 2209/03; G06K 9/2063; G06K 7/1417

See application file for complete search history.

(56) References Cited

U.S. PATENT DOCUMENTS

| | | | | | |
|---|---|---|---|---|---|
| 8,547,563 | B2 * | 10/2013 | Ray | ..................... | H04N 1/00307 358/1.13 |
| 8,861,047 | B2 * | 10/2014 | Ishido | ................ | H04N 1/00681 358/449 |
| 8,941,894 | B2 * | 1/2015 | Tanaka | ............... | H04N 1/00806 348/E5.037 |
| 9,025,212 | B2 * | 5/2015 | Tanaka | ............... | H04N 1/00806 358/474 |
| 9,185,262 | B2 | 11/2015 | Tagawa | | |
| 9,369,602 | B2 * | 6/2016 | Mutsuo | ................... | H04N 1/04 |

(Continued)

FOREIGN PATENT DOCUMENTS

| | | | |
|---|---|---|---|
| JP | 2012-099141 A | 5/2012 | |
| JP | 2015-088977 A | 5/2015 | |

*Primary Examiner* — Kent Yip
(74) *Attorney, Agent, or Firm* — IP Business Solutions, LLC (57) ABSTRACT

An image reading device includes: an operation acceptance section that accepts an operation input from a user; a platen glass; an image reading section; an area determination section that determines, from a difference in input light volume among various points on a whole image acquired through the reading by the image reading section, an image area representing a display screen in the whole image; an analyzing section that retrieves a print target image associated with a data code when the data code exists within the image area of the display screen determined by the area determination section; and an image creating section that creates an image in which the print target image retrieved by the analyzing section is composited into the image area of the display screen in the whole image, the image area being determined by the area determination section.

8 Claims, 6 Drawing Sheets

(56) References Cited

U.S. PATENT DOCUMENTS

| | | | |
|---|---|---|---|
| 9,692,942 B2 * | 6/2017 | Osadchyy | H04N 1/444 |
| 2015/0116793 A1 | 4/2015 | Tagawa | |
| 2016/0048826 A1 * | 2/2016 | Fefferman | G06Q 20/3274 705/23 |

* cited by examiner

IMAGE READING DEVICE AND IMAGE FORMING APPARATUS

INCORPORATION BY REFERENCE

This application claims priority to Japanese Patent Application No. 2016-190390 filed on Sep. 28, 2016, the entire contents of which are incorporated by reference herein.

BACKGROUND

The present disclosure relates to image reading devices and image forming apparatuses, particularly relates to a technique of reading a light emitting display screen of a mobile information terminal and the like.

An image reading device such as a copier uses, for example, a light irradiation section to irradiate an original document, and reads an image from the original document by receiving the light reflected from the original document with a charge coupled device (CCD) sensor. In addition to a conventional paper medium, a display screen of a recently widely used mobile information terminal, such as smartphones and tablets, has become a reading target of the image reading device.

A smartphone and the like has a self-luminous display screen, thus in some cases, an electric charge of the CCD becomes saturated in reading the display screen, which causes the image reading device that reads reflected light to receive a light more than presumed volume. This results in a failure in reading the display screen with suitable gradation. A technique to reduce volume of a light source (light irradiation section) in a case where a reading target material has a light emitting screen is disclosed.

The display screen of the smartphone and the like sometimes displays a data code such as a QR code (a registered trademark). In a case where the smartphone displaying the QR code is a reading target of a copier, the copier outputs either a printed matter showing information embedded in the QR code or a printed matter showing the smartphone displaying the QR code.

SUMMARY

A technique improved over the aforementioned technique is proposed herein as one aspect of the present disclosure.

An image reading device according to the one aspect of the present disclosure includes an operation acceptance section, a platen glass, an image reading section, an area determination section, an analyzing section, and an image creating section.

The operation acceptance section accepts an operation input from a user.

On the platen glass, an original document is placed.

The image reading section reads a display screen of an image display device placed on the platen glass.

The area determination section determines, from a difference in input light volume among various points on a whole image acquired through the reading by the image reading section, an image area representing the display screen in the whole image.

The analyzing section determines whether a preset data code exists within the image area of the display screen determined by the area determination section, and in a case where the data code exists, analyzes the data code and retrieves a print target image associated with the data code.

The image creating section performs image creation processing that creates an image in which the print target image retrieved by the analyzing section is composited, in place of an image representing the data code, into the image area of the display screen in the whole image determined by the area determination section.

DETAILED DESCRIPTION

Figure 1:
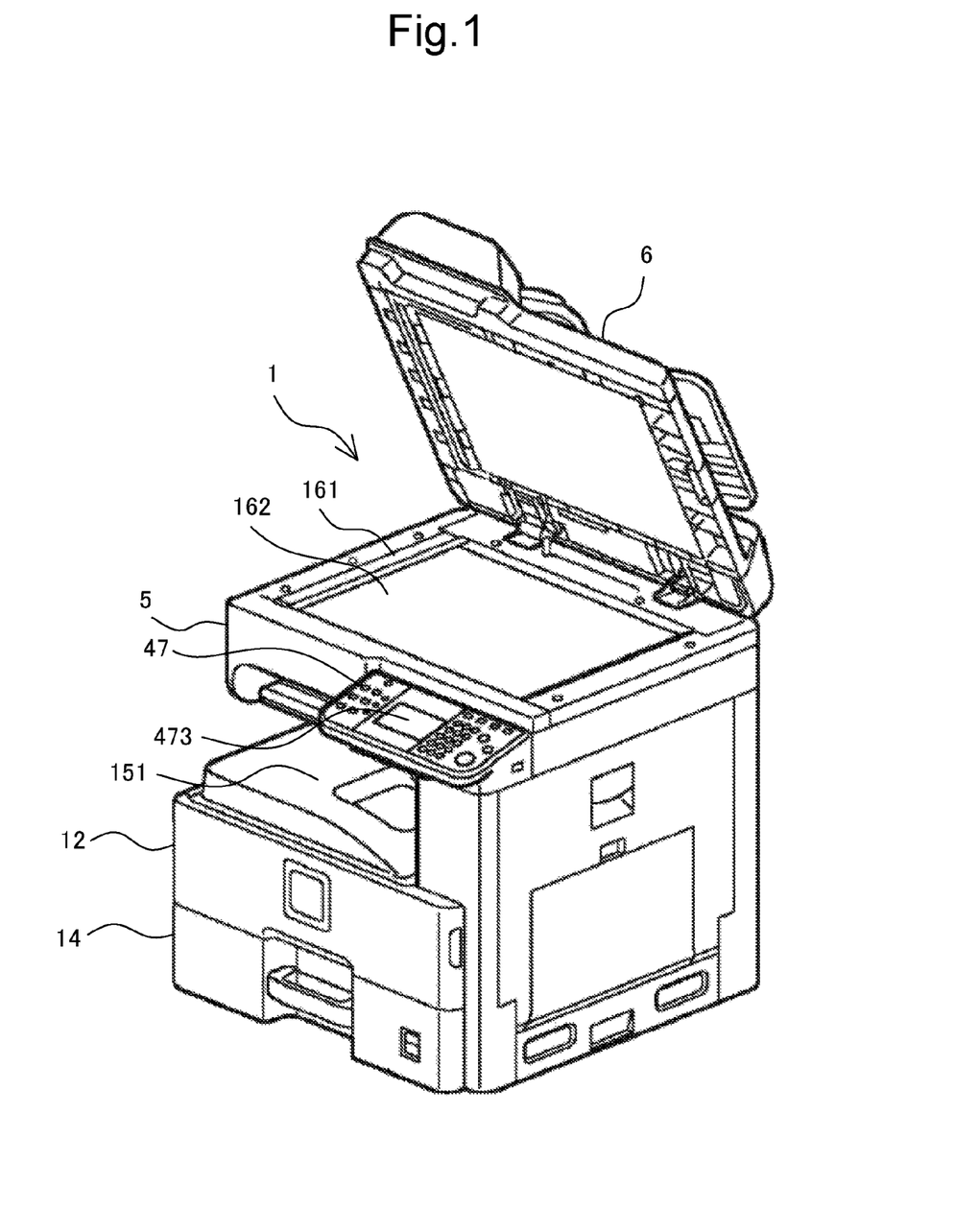
FIG. 1 is a perspective view showing an appearance of an image forming apparatus according to an embodiment of the present disclosure.
Figure 2:
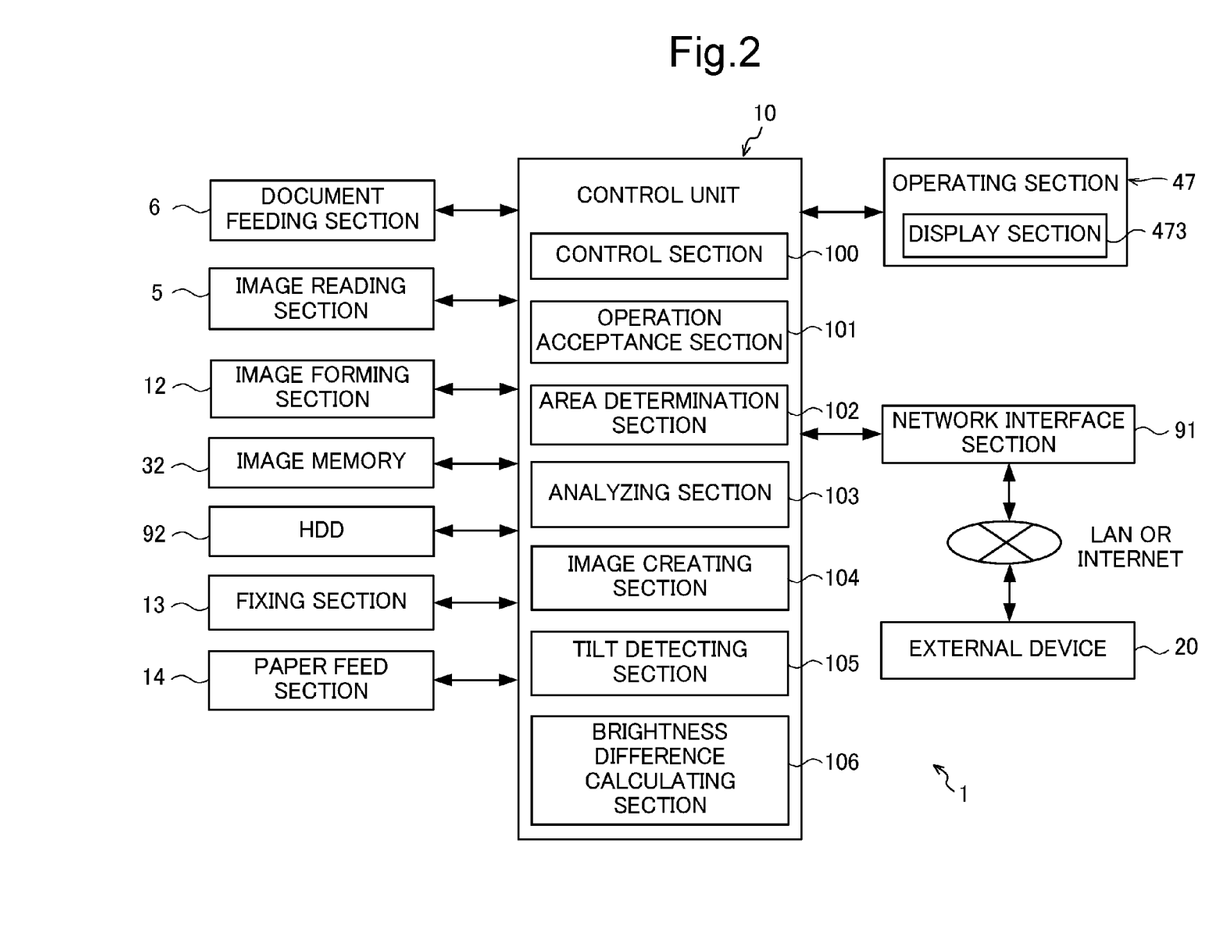
FIG. 2 is a functional block diagram schematically showing an essential internal configuration of the image forming apparatus according to the embodiment.

Hereinafter, a description will be given for an embodiment according to an image reading device and an image forming apparatus of the present disclosure with reference to the drawings. FIG. 1 is a perspective view showing an appearance of the image forming apparatus according to the embodiment of the present disclosure. FIG. 2 is a functional block diagram schematically showing an essential internal configuration of the image forming apparatus according to the embodiment.

The image forming apparatus 1 is a multifunction peripheral (MFP) having a plurality of functions, such as copying, printing, scanning, and facsimile transmission. The image forming apparatus 1 includes a control unit 10, a document feeding section 6, an image reading section 5, an image forming section 12, an image memory 32, a hard disk drive (HDD) 92, a fixing section 13, a paper feed section 14, an operating section 47, and a network interface section 91.

The image reading section 5 uses a light irradiation section to irradiate an original document, and reads an image from the original document by receiving the light reflected from the original document. The image reading section 5 has a fed-document-reading platen glass (contact glass) 161 that reads an original document fed from the document feeding section 6 and a place-reading platen glass 162 on which an original document is placed. The place-reading platen glass 162 is one example of the platen glass in What is claimed is.

Figure 3A:
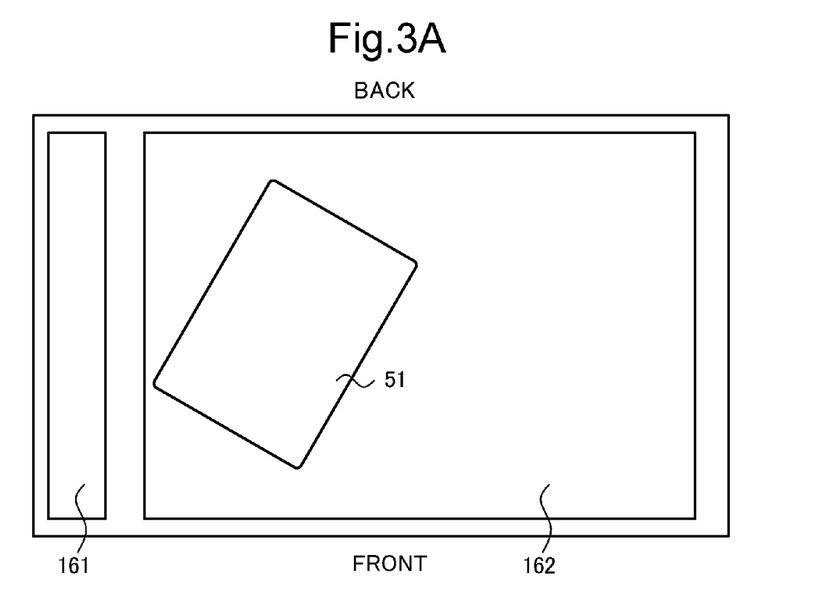
FIG. 3A is a view showing a state where a tablet is placed on a place-reading platen glass when viewed from above.
Figure 3B:
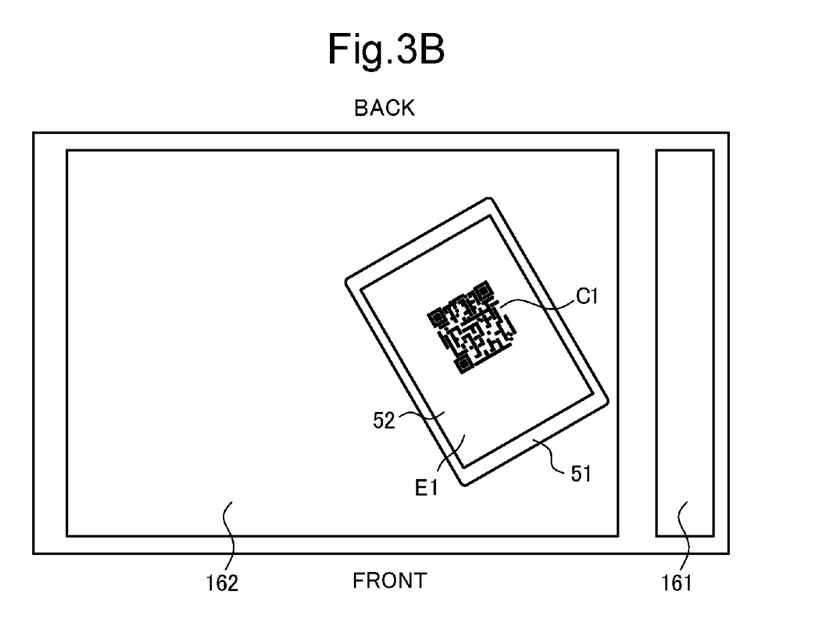
FIG. 3B is a view showing a state where the tablet is placed on the place-reading platen glass when viewed from below.

FIGS. 3A and 3B are views showing states where a tablet 51 is placed on the place-reading platen glass 162; FIG. 3A is when viewed from above of the place-reading platen glass 162, whereas FIG. 3B is when viewed from below of the place-reading platen glass 162. The tablet 51 is placed on the place-reading platen glass 162 so that a touch screen 52 faces down. Suppose a QR code C1 is displayed on the touch screen 52 of the tablet 51. Here in this description, a QR code serves as an example of a data code. The tablet 51 is one example of the image display device in What is claimed is.

The document feeding section 6 feeds an original document to be read to the image reading section 5. The document feeding section 6 is configured in an openable and closable manner by, for example, a hinge at above of the image reading section 5. In reading the original document placed on the place-reading platen glass 162, the document feeding section 6 functions as a document pressing cover.

The image forming section 12 forms a toner image of an image to be printed on a paper sheet (recording medium). The image memory 32 is a region for temporarily storing the image data of the original document acquired through the reading by the image reading section 5, and data to be printed by the image forming section 12.

The HDD 92 is a large-capacity storage device for storing source images of the original document read by the image reading section 5, and so forth.

The fixing section 13 serves to fix the toner image on the paper sheet onto the paper sheet by thermocompression, and the paper sheet that has undergone the fixing process is outputted to an output tray 151. The paper feed section 14 picks up and conveys the paper sheet stored in a paper feeding cassette.

The operating section 47 receives instructions from an operator, for operations and processing that the image forming apparatus 1 is capable of performing, such as an image forming operation execution instruction and a document reading operation execution instruction. The operating section 47 includes a display section 473 for displaying guidance and so forth to the operator. The display section 473 is made up with a touch panel and the operator can operate the image forming apparatus 1 by touching buttons and keys displayed on the touch panel.

The network interface section 91 includes a communication module such as a local area network (LAN) board, to transmit and receive data to and from an external device 20 such as a personal computer (PC) in the local area or in the Internet, through the LAN connected to the network interface section 91.

The control unit 10 is made up to include a processor, a random access memory (RAM), a read only memory (ROM), and a dedicated hardware circuit. The processor is, for example, a central processing unit (CPU), an application specific integrated circuit (ASIC), or a micro processing unit (MPU). The control unit 10 includes a control section 100, an operation acceptance section 101, an area determination section 102, an analyzing section 103, an image creating section 104, a tilt detecting section 105, and a brightness difference calculating section 106.

The control unit 10 acts as the control section 100, the operation acceptance section 101, the area determination section 102, the analyzing section 103, the image creating section 104, the tilt detecting section 105, and the brightness difference calculating section 106 when the processor executes a control program stored in the HDD 92. Here, the control section 100, the operation acceptance section 101, the area determination section 102, the analyzing section 103, the image creating section 104, the tilt detecting section 105, and the brightness difference calculating section 106 may each be constituted in the form of a hardware circuit, instead of being performed according to the control program. This also applies to other embodiments, unless otherwise specifically noted.

The control section 100 serves to control the overall operation of the image forming apparatus 1. The control section 100 is connected to the document feeding section 6, the image reading section 5, the image forming section 12, the image memory 32, the fixing section 13, the paper feed section 14, the HDD 92, the network interface section 91, and the operating section 47, so as to control drive of each of the mentioned sections.

Figure 4:
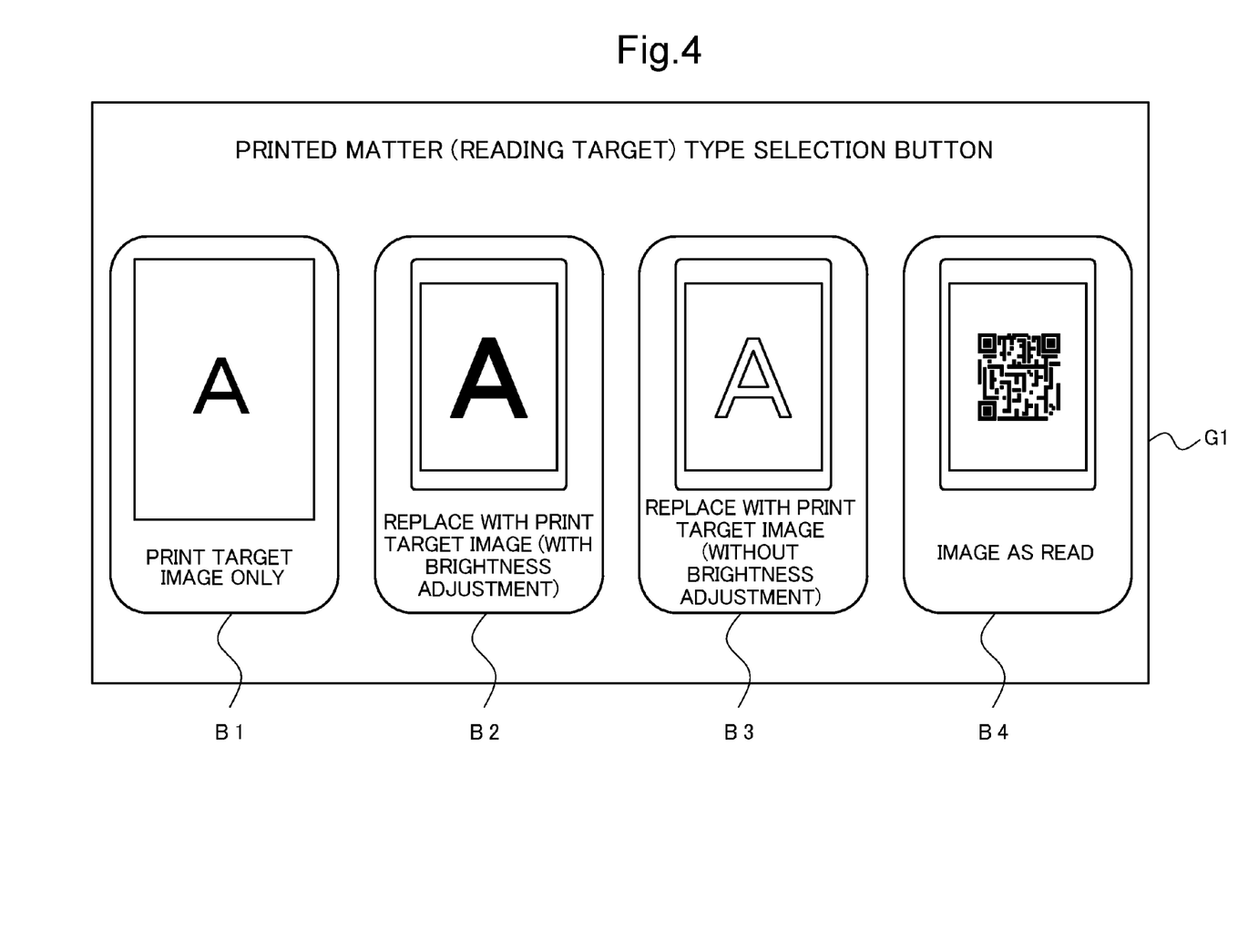
FIG. 4 is a view showing an example of an operation screen displayed on a display section.

The control section 100 allows the display section 473 to display an operation screen G1, as shown in FIG. 4, on which selection buttons B1, B2, B3 and B4, each showing a print result (a read image) in pattern and so forth, are formed. The selection buttons B1 to B4 are printed matter type selection buttons to be used by a user in selecting the type of the printed matter (which may also be the read image) in a case where the mobile information terminal, such as a tablet, displaying a QR code is a reading target.

In the QR code, information indicating a print target image associated with the QR code is embedded.

The selection button B1 shows the pattern and so forth indicating that the print result only contains the print target image acquired by analyzing the QR code. The selection button B2 shows the pattern and so forth indicating that the print target image acquired by analyzing the QR code is composited into the display screen of the mobile information terminal (the QR code is replaced with the print target image) and indicating that a brightness adjustment is not performed on the print target image.

The selection button B3 shows the pattern and so forth indicating that the print target image acquired by analyzing the QR code is composited into the display screen of the mobile information terminal (the QR code is replaced with the print target image) and indicating that brightness adjustment is performed on the print target image. The selection button B4 shows the pattern and so forth indicating that the print target image acquired by analyzing the QR code is not displayed and the mobile information terminal as the original document is to be copied in a conventional manner.

The operation acceptance section 101, for example, accepts an operation inputted from a user by a touch panel function of the display section 473 of the operating section 47. For example, the operation acceptance section 101 accepts a touch on the selection buttons B1 to B4 illustrated in FIG. 4 and accepts user's selection among the selection buttons B1 to B4. In a case where the operation acceptance section 101 does not accept any of the touch on the selection buttons B1 to B4, the operation acceptance section 101 accepts the selection button B4 as the user's operation.

When the user operates the selection button B1, the operation acceptance section 101 accepts an instruction indicating that the print result is to be the print target image acquired by analyzing the QR code. When the user operates the selection button B2, the operation acceptance section 101 accepts an instruction indicating that the print target image is composited into the display screen of the mobile information terminal and the brightness adjustment is not to be performed on the print target image. When the user operates the selection button B3, the operation acceptance section 101 accepts an instruction indicating that the print target image is to be composited into the display screen of the mobile information terminal and the brightness adjustment is to be performed on the print target image. When the user operates the selection button B4, the operation acceptance section 101 accepts an instruction indicating that the image read as it is without using the print target image is to be formed.

The area determination section 102 determines, from a difference in input light volume among various points on a whole image acquired through the reading by the image reading section 5, an image area representing the display screen of the tablet 51, which is the reading target, in the whole image. In other words, the area determination section 102 determines, from the difference in input light volume among various points on the whole image acquired through the reading by the image reading section 5, the area of a light emitting display screen (for example, a touch screen 52 which is the display screen of the tablet 51) included in the tablet 51 placed on the place-reading platen glass 162. Display screens of mobile information terminals, such as tablets, are self-luminous, so that the input light volume differs between the display screen and other parts. The area determination section 102 determines the image area of the display screen based on the difference.

The analyzing section 103 reads the QR code from the image area of the display screen determined by the area determination section 102 and analyzes the QR code. In other words, the analyzing section 103 determines whether the QR code indicating a predetermined QR code exists within the image area of the display screen determined by the area determination section 102, and when such the QR code exists, analyzes the QR code and retrieves the print target image associated with the QR code. For example, the analyzing section 103 reads the QR code C1 from the area of the touch screen 52 of the tablet 51 having being determined by the area determination section 102 and analyzes the QR code C1 to retrieve the print target image associated with the QR code C1.

Examples of the print target image that the analyzing section 103 acquires by analyzing the QR code are: (1) information itself (such as text information) embedded in the QR code; and (2) when the information embedded in the QR code is a uniform resource locator (URL), information (such as image data and character data) stored in a location indicated by the URL.

The image creating section 104 performs image creation processing for creating an image in which the print target image retrieved by the analyzing section 103 is composited into the image area of the display screen in the whole image read by the image reading section 5; the image area has been determined by the area determination section 102.

The tilt detecting section 105 detects a tilt of the QR code with respect to the whole image read by the image reading section 5. For example, the tilt detecting section 105 detects the tilt of the QR code based on the finder patterns structuring the QR code (position detecting patterns). The finder patterns structuring the QR code are the blocks in three corners. The tilt of the QR code can be detected on the basis of the tilts of these three blocks with respect to the whole image.

The horizontal side and the vertical side of the QR code are displayed parallel to the horizontal side and the vertical side of the display screen of the tablet 51 respectively, so that the tilt of the QR code coincides with that of the display screen of the tablet 51. Thus, the tilt detecting section 105 can detect the tilt of the display screen of the tablet 51 by detecting the tilt of the QR code.

The brightness difference calculating section 106 calculates a brightness difference between degree of brightness of the QR code having been acquired through the reading by the image reading section 5 and a reference brightness set for the print target image. For example, the brightness difference calculating section 106 calculates the brightness difference between degree of brightness of a black part structuring the QR code having been acquired through the reading by the image reading section 5 and the reference brightness set for the print target image. In a case where the degree of brightness of the black part structuring the QR code C1, which is displayed on the touch screen 52 of the tablet 51 placed on the place-reading platen glass 162, is "7" and the reference brightness is "3", the brightness difference calculating section 106 calculates the brightness difference "4". It should be noted that the "brightness" referred to in the present embodiment includes "luminance".

Figure 5:
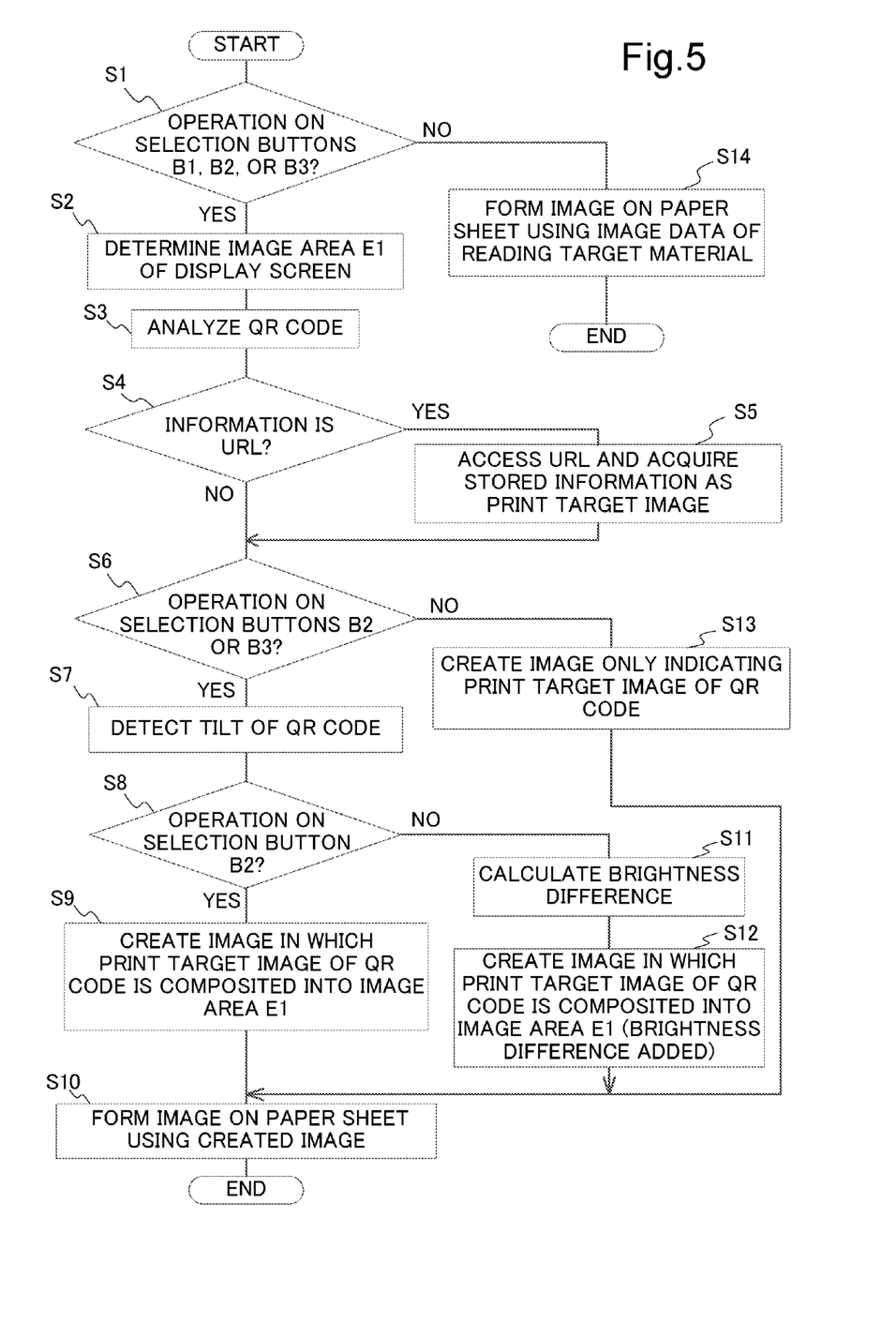
FIG. 5 is a flowchart showing an example of image reading processing and image forming processing, that are performed by the image forming apparatus.

Hereinafter, image reading processing and image forming processing performed by the image forming apparatus 1 will be detailed. FIG. 5 is a flowchart showing an example of the image reading processing and the image forming processing, that are performed by the image forming apparatus 1. For example, the image forming apparatus 1 performs the image reading processing and the image forming processing when the operation acceptance section 101 accepts a copying instruction and the reading of the tablet 51 placed on the place-reading platen glass 162 is performed by the image reading section 5.

First, the control section 100 determines whether the user operation on any of the selection buttons B1, B2, or B3 displayed on the display section 473 has been accepted by the operation acceptance section 101 (S1).

Upon determination by the control section 100 that the operation acceptance section 101 has accepted the user's operation on any of the selection buttons B1, B2, or B3 (YES in S1), the area determination section 102 determines, from the difference in the input light volume among the various points on the whole image acquired through the reading by the image reading section 5, an image area E1 (FIG. 3B) representing the display screen of the tablet 51 (for example, the touch screen 52), which is the reading target in the whole image (S2).

Second, the analyzing section 103 reads the QR code from the image area E1 representing the display screen having been determined by the area determination section 102, and analyzes the QR code (S3). The analyzing section 103 determines whether the information embedded in the QR code acquired by analyzing the QR code is a URL or not (S4).

Upon determination by the analyzing section 103 that the information embedded in the QR code is the URL (YES in S4), the analyzing section 103 accesses the location (i.e., a server which is the external device 20) indicated by the URL via the network interface section 91, and acquires the information associated with the QR code, which is stored in the location, as the print target image (S5).

Accordingly, when the information embedded in the QR code is the URL, the print target image acquired as the analyzing section 103 analyzes the QR code is the information stored in the location indicated by the URL. In contrast, when the information embedded in the QR code is not the URL, the print target image acquired as the analyzing section 103 analyzes the QR code is the information as it is embedded in the QR code.

Third, the control section 100 determines whether the user's operation on the selection buttons B2 or B3 being displayed on the display section 473 has been accepted by the operation acceptance section 101 (S6).

Upon determination by the control section 100 that the user's operation on the selection buttons B2 or B3 has been accepted by the operation acceptance section 101 (YES in S6), the tilt detecting section 105 detects the tilt of the QR code from the finder patterns structuring the QR code (S7).

Subsequently, the control section 100 determines whether the user's operation on the selection button B2 has been accepted by the operation acceptance section 101 (S8). Upon determination by the control section 100 that the operation acceptance section 101 has accepted the user's operation on the selection button B2 (YES on S8), the image creating section 104 processes the print target image acquired in the above-described S3 or S5 into the size fittable to the image area E1 and into a tilted form in accordance with the tilt detected by the tilt detecting section 105, and performs the image creation processing in which the print target image having gone through the just mentioned processing is composited into the image area E1 of the display screen having been determined by the area determination section 102 (S9). It should be noted that the control section 100 may also be designed to store the image acquired through the image creation processing performed by the image forming section 12 into the HDD 92.

Figure 6A:
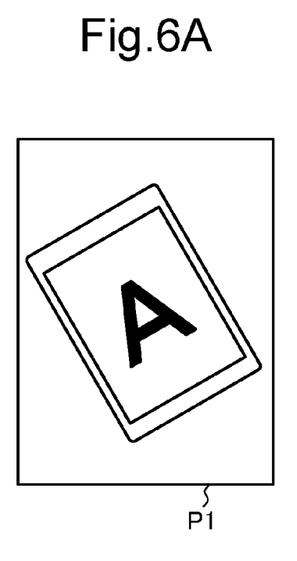
FIGS. 6A to 6D are views showing examples of output objects outputted from the image forming apparatus.

Following the aforementioned processing, the control section 100 causes the image forming section 12 to form an image using the image acquired through the image creation processing performed by the image forming section 12 (S10). The printed matter of the image acquired through the image creation processing can be obtained through the image formation as the image forming section 12 performs the image formation on the paper sheet. FIG. 6A exemplifies a condition in which the image created in S9 is formed on a paper sheet P1. It should be noted that the capital letter "A" illustrated in the figure denotes the print target image.

In contrast, upon determination by the control section 100 that the user's operation on the selection button B2 has not been accepted by the operation acceptance section 101, in other words, upon determination that the user's operation on the selection button B3 has been accepted (NO in S8), the brightness difference calculating section 106 calculates the brightness difference between the degree of brightness of the black part structuring the QR code having been acquired through the reading by the image reading section 5 and the reference brightness (S11).

Next, the image creating section 104 processes the print target image acquired in the above-described S3 or S5: into the size fittable to the image area E1; into the tilted form in accordance with the tilt detected by the tilt detecting section 105; and further into a form in which a color tone, brightness, and so on of the image are changed by adding the brightness difference. The image creating section 104 then performs the image creation processing in which the print target image having gone through the just mentioned processing is composited into the image area E1 of the display screen having been determined by the area determination section 102 (S12). The processing in S10 follows thereafter.

Figure 6B:
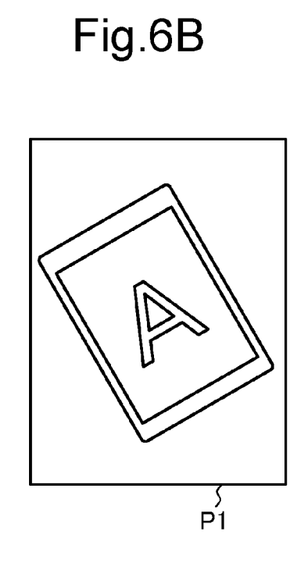

FIG. 6B illustrates one example of the image created in S12 is formed on the paper sheet P1. For example, in the case where the degree of brightness of the black part structuring the QR code C1, which is displayed on the touch screen 52 of the tablet 51 placed on the place-reading platen glass 162, is "7" and the pre-recorded reference brightness is "3", the brightness difference calculating section 106 calculates the brightness difference "4".

In some cases, when the image creating section 104 composites the print target image into the image area E1 of the display screen (touch screen 52) without adding the brightness difference "4" like the processing performed in S9, the print target image may be seen in a darker tone. This is because the light from the touch screen 52 is not considered in compositing the print target image although the touch screen 52 in actuality is self-luminous. In comparison, when the degree of brightness of the print target image is increased in a four-level by, for example, adding the brightness difference "4" like the processing performed in S12, it is possible to create a condition closer to the condition where the print target image is actually displayed on the display screen (touch screen 52).

Figure 6C:
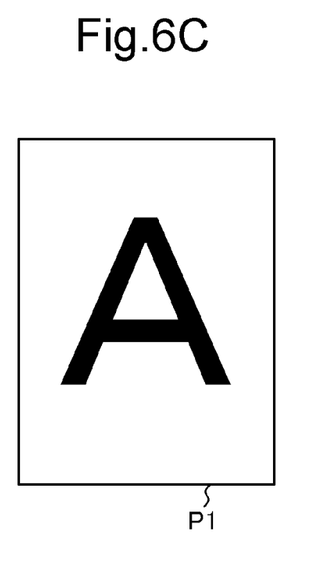

In addition, upon determination by the control section 100 that the user's operation on the selection buttons B2 or B3 has not been accepted by the operation acceptance section 101, i.e., upon determination that the user's operation on the selection button B1 has been accepted (NO in S6), the image creating section 104 creates the image representing only the print target image (S13). The processing in S10 follows thereafter. FIG. 6C exemplifies a condition in which the image created in S13 is formed on the paper sheet P1.

Figure 6D:
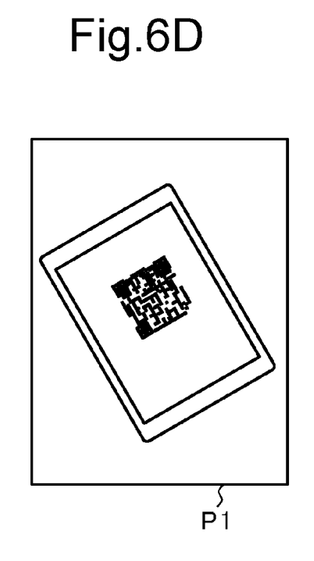

Furthermore, upon determination by the control section 100 that the user's operation on any of the selection buttons B1, B2, or B3 has not been accepted by the operation acceptance section 101, i.e., upon determination that the user's operation on the selection button B4 has been accepted (NO in S1), the control section 100 causes the image forming section 12 to perform the image formation on the paper sheet based on the image data of the reading target material read by the image reading section 5 (S14). In other words, the image representing the tablet 51 read by the image reading section 5 and the display screen thereof is formed as it is on the paper sheet. FIG. 6D exemplifies a condition in which the image representing the tablet 51 read by the image reading section 5 and the display screen thereof is formed as it is on the paper sheet P1.

According to the above-described embodiment, when the user inputs, by the operating section 47, the instruction that the print target image acquired by analyzing the QR code is to be the output object (printed matter), the image on which the print target image is composited into the image area E1 of the display screen of the tablet 51 (touch screen 52) becomes the output object. Also, when the user inputs, by the operating section 47, the instruction that the print target image is not to be the output object (printed matter), the image as read, which is indicated by the image data having been acquired by the reading by the image reading section 5, becomes the output object (printed matter).

Thus, the image forming apparatus 1 according to the embodiment is capable of selectively outputting, in accordance with the user's needs, each respective printed matter illustrated in FIGS. 6A to 6D. Hence, user satisfaction can be enhanced with respect to the output object in reading the tablet 51 (a device having a light emitting display screen) on which the QR code is displayed.

In some cases, for example, a user might desire to print an image further processed from a printed matter containing the information itself embedded in a QR code. There is a technique to facilitate readability of the QR code by switching a mode into a special mode when imaging a QR code displayed on a mobile phone terminal (mobile information terminal). However, this type of technique has difficulties in changing the printing condition of the information embedded in the QR code.

In other words, in a case where the reading target is the display screen of the information processing apparatus comprising the mobile information terminal and the like, the display screen of which is displaying the data code such as the QR code, the above-described embodiment can process an image acquired by the reading and can differentiate conditions in printing the information embedded in the data code. Thus, improvements on the user satisfaction can be provided.

The configuration and processing described in the above embodiment with reference to FIGS. 1 to 6D are merely exemplary, and not intended to limit the scope of the disclosure.

While the present disclosure has been described in detail with reference to the embodiments thereof, it would be apparent to those skilled in the art the various changes and modifications may be made therein within the scope defined by the appended claims.

What is claimed is:

1. An image reading device comprising:
   an operation acceptance section that accepts an operation input from a user;
   a platen glass on which an original document is placed;
   an image reading section that reads a display screen of an image display device placed on the platen glass;
   an area determination section that determines, from a difference in input light volume among various points on a whole image acquired through the reading by the image reading section, an image area representing the display screen in the whole image;
   an analyzing section that determines whether a preset data code exists within the image area of the display screen determined by the area determination section, and in a case where the data code exists, analyzes the data code and retrieves a print target image associated with the data code; and
   an image creating section that performs image creation processing, the image creation processing creating an image in which the print target image retrieved by the analyzing section is composited, in place of an image representing the data code, into the image area of the display screen in the whole image determined by the area determination section.

2. The image reading device according to claim 1, further comprising a tilt detecting section that detects a tilt of the data code with respect to the whole image,
   wherein in performing the image creation processing, the image creating section creates, in accordance with the tilt detected by the tilt detecting section, an image in which the print target image is composited into the image area of the display screen determined by the area determination section.

3. The image reading device according to claim 1, further comprising a brightness difference calculating section that calculates a brightness difference between degree of brightness of the data code acquired through the reading by the image reading section and a reference brightness set for the print target image,
   wherein in performing the image creation processing, the image creating section creates an image in which the print target image is composited into the image area of the display screen determined by the area determination section with adding the brightness difference calculated by the brightness difference calculating section.

4. The image reading device according to claim 3, wherein when the operation acceptance section accepts an instruction to add the brightness difference, the image creating section creates the composited image of the print target image with adding the brightness difference, and when the operation acceptance section accepts an instruction not to add the brightness difference, the image creating section creates the composited image of the print target image in an original condition without adding the brightness difference.

5. The image reading device according to claim 1,
   wherein, as the image creation processing, the image creating section is configured so that an image only consisting of the print target image can be created in place of the whole image, and
   when the operation acceptance section accepts an instruction to create the image only consisting of the print target image, the image creating section creates the image only consisting of the print target image, and when the operation acceptance section accepts an instruction to composite the print target image into the whole image, the image creating section creates an image in which the print target image is composited into the whole image.

6. The image reading device according to claim 1, wherein when the operation acceptance section accepts an instruction to execute the image creation processing, the image creating section executes the image creation processing, and when the operation acceptance section accepts an instruction not to execute the image creation processing, the image creating section does not execute the image creation processing.

7. The image reading device according to claim 3,
   wherein, as the image creation processing, the image creating section is configured so that an image only consisting of the print target image can be created in place of the whole image, and
   when the operation acceptance section accepts: an instruction to create an image only consisting of the print target image; an instruction to create the image in which the print target image is composited, in place of the image representing the data code, into the image area of the display screen determined by the area determination section; an instruction to create the image in which the print target image is composited, in place of the image representing the data code, into the image area of the display screen determined by the area determination section with adding the brightness difference calculated by the brightness difference calculating section; or an instruction to create the whole image acquired through the reading by the image reading section, the image creating section executes an image creation of the instruction accepted by the operation acceptance section.

8. An image forming apparatus comprising:
   the image reading device according to claim 1; and
   an image forming section that forms an image on a recording medium on a basis of an image data of the image created by the image creating section or an image data of the original document which is acquired through the reading by the image reading section.

* * * * *